D. Lane,
Saw-Mill Head-Block.
Nº 32,774. Patented July 9, 1861.

Witnesses:
J. W. Coombs
Wm. Taisch

Inventor:
Dennis Lane
per Munn & Co.
Attorneys

UNITED STATES PATENT OFFICE.

DENNIS LANE, OF PLAINFIELD, VERMONT.

METHOD OF SETTING THE LOG IN SAWMILLS.

Specification forming part of Letters Patent No. 32,774, dated July 9, 1861; Reissued February 18, 1868, No. 2,872.

*To all whom it may concern:*

Be it known that I, DENNIS LANE, of Plainfield, in the county of Washington and State of Vermont, have invented a new and Improved Log-Setting Device for Sawmills; and I do hereby declare that the following is a full, clear, and exact description of the same, reference being had to the annexed drawings, making a part of this specification, in which—

Figure 1:
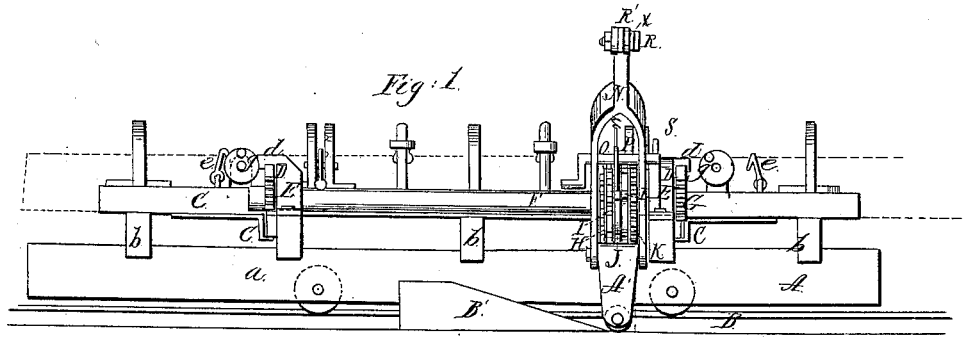
Figure 3:
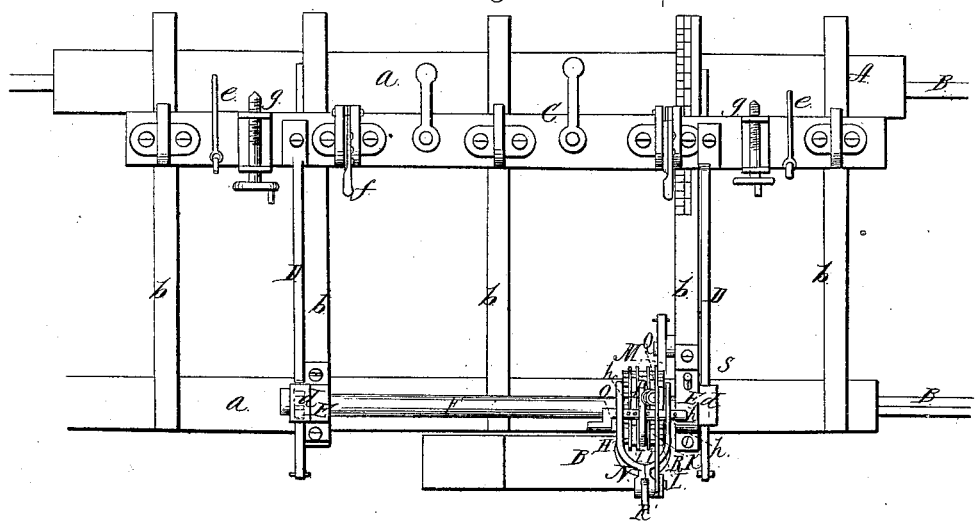
Figure 2:
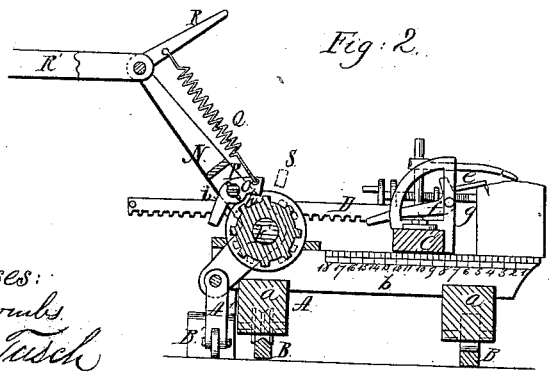

Figure 1, is a side view of my invention; Fig. 2, a transverse vertical section of the same, taken in the line $x$, $x$, Fig. 1; Fig. 3, a plan or top view of the same.

Similar letters of reference indicate corresponding parts in the several figures.

The object of this invention is to obtain a means for setting the carriages of saw mills, which will admit of a single attendant adjusting the log to the saw and also operating the brakes for feeding and gigging-back the carriage.

The invention also has for its object the ready adapting of the parts for adjusting the log to saw boards of different thicknesses as hereinafter described.

To enable those skilled in the art to fully understand and construct my invention, I will proceed to describe it.

A, represents the log carriage of a saw mill; B, B, the ways or guides on which it is placed and allowed to work freely. The carriage A, is formed of two parallel bars $a$, $a$, connected by cross-ties $b$.

C, is a bar which is placed on the cross-ties $b$, and parallel with the bars $a$, $a$. This bar C, is allowed to slide freely on the cross-ties $b$, and it is kept in proper position by guides $c$, $c$, shown in Fig. 1. To the bar C, two racks D, D, are attached at right angles. These racks pass through guides $d$, $d$, which are at the upper parts of the bearings E, E, of a shaft F, which shaft has a pinion G, at each end, the pinions gearing into the racks D, D.

On the bar C, there are placed the usual dogs $e$, $e$, setting levers $f$, $f$, and screws $g$, for adjusting and securing the log to the bar C, and on the shaft F, there are placed side by side a series of ratchets H, I, J, K, the teeth of which are placed at different distances apart, that is to say, some have more teeth than others and no two have precisely the same number of teeth. On the shaft F, there is also placed a ratchet L, into which a retaining pawl M, catches.

N, is a forked lever which is fitted on the shaft F, the forked end of the lever embracing the ratchets, as shown clearly in Figs. 1, and 3. In the forked part of the lever N, there is fitted transversely a rod O, on which a dog P, is placed loosely. This dog P, is allowed to slide on rod O, and it may be adjusted so as to engage with any of the ratchets H, I, J, K, the dog being retained in proper position by means of pins $h$, on the rod O. When the rod O, is turned so that the pins $h$, will be at the upper side of the rod, the dog P, may be shoved along on the rod owing to a slot $i$, being made in the dog, see Fig. 2. The dog P, is connected by a spiral spring Q, with a lever R, attached to the outer end of the forked lever N. A lever R', is also attached to the outer end of the forked lever N.

S, is a pin or stop attached to the bearing E, adjoining the ratchets. This stop S, determines the length of the inward movement of the lever N.

From the above description it will be seen that the bar C, may be moved laterally on the carriage A, by actuating the forked lever N, the dog P, engaging with one of the ratchets H, I, J, or K, and thereby turning the shaft F, the pinions G, of which move the racks D. This movement of bar C, sets the log, shown in red in Figs. 1, and 2, to the saw, and the movement of bar C, may be varied as desired by setting the dog P, in different ratchets, the greater the number of teeth in a ratchet the less the movement of the bar C, and vice versa. The log therefore may be sawed into boards of varying thicknesses as may be required. The dog P, may be freed from any of the ratchets by simply raising the lever R. The bar C, may be moved or adjusted backward to its original position at any time by lifting dog P, disengaging pawl M, and shoving the bar C, back. The lever N, may be operated automatically by having a pendant A', which is attached to it pass up an inclined bar B', a roller $a'$, being in the lower end of the pendant A'.

Having thus described my invention what I claim as new and desire to secure by Letters Patent, is,

The employment or use of the ratchets H, I, J, K, having teeth at different distances apart in connection with the adjustable dog P, placed on the rod O, which is provided with retaining pins $h$, the ratchets being placed on the shaft F, having pinions G, G, at its ends which gear into racks D, D, attached to bar C, all being arranged as and for the purpose set forth.

DENNIS LANE.

Witnesses:
  RODNEY H. CRISTY,
  J. M. RICHARDS.